Nov. 21, 1967  K. J. MAHONEY  3,353,546
VEHICLE WASHING ASSEMBLY
Filed March 15, 1965  2 Sheets-Sheet 1
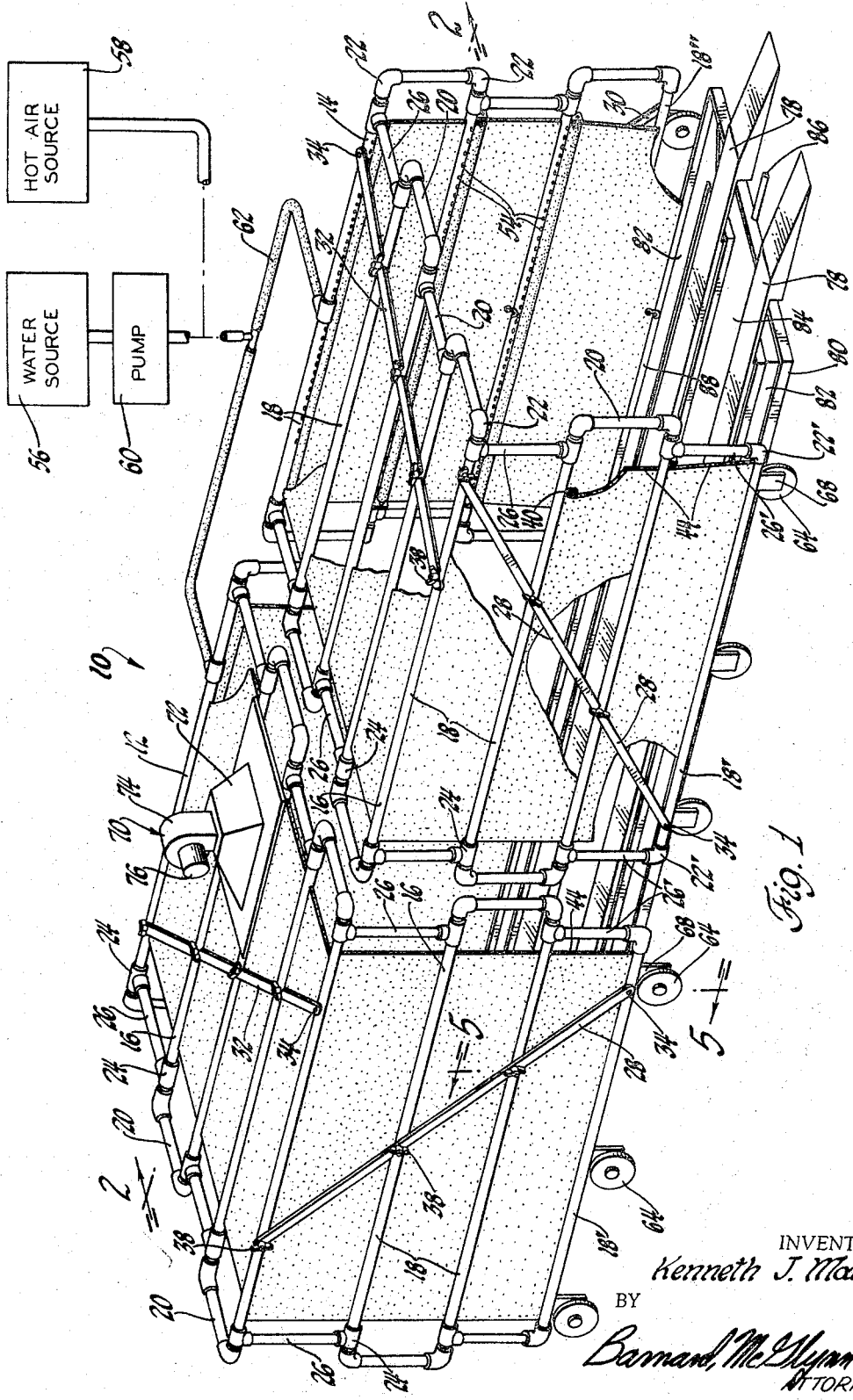
INVENTOR.
Kenneth J. Mahoney
BY
Barnard, McLynn & Leising
ATTORNEYS Nov. 21, 1967  K. J. MAHONEY  3,353,546
VEHICLE WASHING ASSEMBLY
Filed March 15, 1965  2 Sheets-Sheet 2
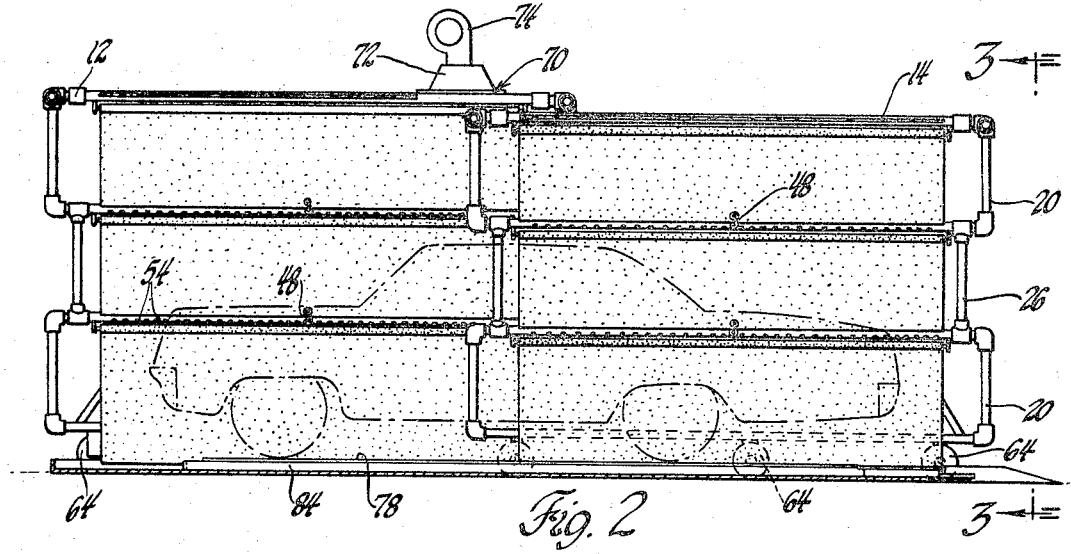
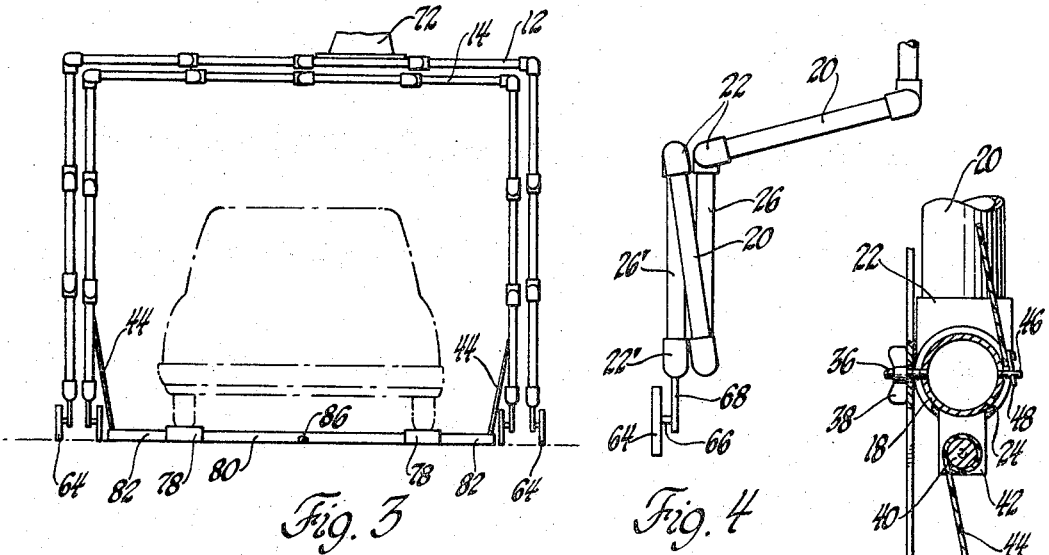
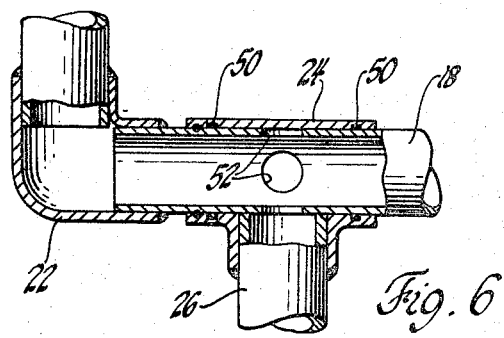
INVENTOR.
Kenneth J. Mahoney
BY
Barnard, McEllynn & Keising
ATTORNEYS

United States Patent Office 3,353,546
Patented Nov. 21, 1967

3,353,546
VEHICLE WASHING ASSEMBLY
Kenneth J. Mahoney, 335 Douglas Drive,
Bloomfield Hills, Mich. 48013
Filed Mar. 15, 1965, Ser. No. 439,803
14 Claims. (Cl. 134—123)

ABSTRACT OF THE DISCLOSURE

A vehicle washing assembly including first and second frames which are independent of one another and respectively self-supporting with the first frame being telescopic within the second frame and each frame including a plurality of substantially horizontally extending frameworks pivotally interconnected so that each frame may be positioned to form a U-shaped enclosure for a vehicle or may be independently folded into a compact unit.

---

The vehicle washing assemblies heretofore utilized are, broadly speaking, of two general types. The first type comprises a means for spraying liquid onto a vehicle but does not utilize an enclosure for covering the vehicle. Typically, such a vehicle washing assembly comprises a series of spray nozzles to extend over a vehicle and are adapted to be moved along the length of a vehicle to spray the entire vehicle. A vehicle washing assembly which does not provide an enclosure for the vehicle is less bulky but does contain the fluid sprayed onto the automobile and, therefore, makes such an assembly inappropriate for use in the garage of a homeowner since, without an enclosure, the spray of fluid is not contained and will spray on articles stored in the garage or on other vehicles in the garage.

The second type of vehicle washing assembly heretofore utilized usually has an enclosure for covering a vehicle but is usually bulky and must be mechanically disassembled for storage when not in use. Such an enclosed automobile washing assembly is unsuitable for use in the garage of a home owner since the assembly must be disassembled when not in use and when assembled it is difficult to park a vehicle in the garage yet have the proper degree of freedom of access to the vehicle.

Furthermore, vehicle washing assemblies heretofore utilized provide no means for receiving or catching the fluid sprayed onto the vehicle, therefore, such sprayed fluid flows freely about the garage floor where it may come into contact and damage articles stored within the garage.

The vehicle washing assemblies heretofore utilized, therefore, are not appropriate for use by an individual homeowner within a garage since such assemblies allow fluid sprayed on the vehicle to contact other articles within the garage and/or are too bulky since disassembly is necessary in order that a vehicle may conveniently be garaged in the space occupied by the vehicle washing assembly.

Accordingly, it is an object and feature of this invention to provide a vehicle washing assembly including a frame which is collapsible for spraying liquid onto a vehicle.

Another object and feature of this invention is to provide a vehicle washing assembly having a pair of frames adapted to cover a vehicle along the length thereof and which frames are telescopic so that one frame may be moved into the other when not in use.

Yet another object and feature of this invention is to provide a vehicle washing assembly having a frame forming an enclosure to cover a vehicle and including a means disposed within the enclosure for receiving fluid sprayed onto a vehicle disposed within the enclosure so that the vehicle washing assembly may be utilized in the garage of a home owner so as to prevent fluid from contacting other articles stored within the garage.

In general, these and other objects may be carried out by an assembly constructed in accordance with the instant invention comprising one or more collapsible frames for forming an enclosure to cover a vehicle. Each collapsible frame includes a plurality of generally rectangular frameworks having a pair of elongated parallel conduit sections interconnected at the respective ends thereof by a pair of parallel end conduit sections. A pair of T connections are disposed for rotation about each of the elongated conduit sections. Interconnecting conduit sections are secured at the respective ends thereof intermediate to the T connections, each of which is disposed on the respective elongated conduit sections of adjacent frameworks. Each frame is prevented from collapsing and is formed into a generally inverted U-shaped frame having a pair of legs and an interconnecting upper portion by first and second braces respectively pivotally connected to the respective lowermost elongated conduit section of each leg of the frame. A threaded stud is attached to each elongated conduit section of the frame. The first and second braces each have a plurality of slots for receiving respective ones of the studs. A nut is disposed on each stud for securing the first brace to the elongated conduit sections associated with one leg of the frame and for securing the second brace to the elongated conduit sections associated with the other leg of the frame so that the frameworks forming each leg of the frame are prevented from pivoting relative to one another. There is also included a third brace which is pivotally connected to one of the elongated conduit sections of the upper portion of the frame and which is movable to traverse all of the elongated conduit sections of the upper portion of the frame. A threaded stud is also attached to each of the elongated conduit sections of the upper portion of the frame and the third brace has a plurality of slots for receiving the studs on the upper portion of the frame. Nuts are disposed on each of the studs on the upper portion of the frame for securing the third brace to respective elongated conduit sections of the upper portion of the frame whereby the frameworks of the upper portion of the frame are prevented from rotating relative to one another. A spring biased roller having a pliable material wound thereabout for unwinding therefrom is disposed adjacent each respective elongated conduit section for preventing the passage of fluid through the frame so that fluid sprayed within the enclosure of the framework does not escape therefrom. The pliable material is removably attachable to the next adjacent elongated conduit section upon being unwound from the roller. The T connections are sealed to the respective elongated conduit sections to prevent fluid leakage therebetween and various ones of the elongated conduit sections have orifices therein for spraying fluid therefrom. Also included is a means for spraying fluid to the conduit sections for flow therein. The frame has wheels attached thereto so that it may easily be moved about. A blower may also be attached to the frame for removing moisture and gases from within the enclosure formed by the frame and moving same to an exhaust environment. A ramp is also included within the enclosure formed by the frame so that a vehicle may be moved onto the ramp. A trough is disposed adjacent the ramp and the frame for extending about and beneath a vehicle which has been moved onto the ramp and for receiving fluid sprayed within the enclosure formed by the frame. The trough has a drain attached thereto so that liquid received by the trough may be conveyed to an appropriate area for dumping.

Other objects and attendant advantages of this invention will be readily appreciated as the same becomes better understood by reference to the following detailed description when considered in connection with the accompanying drawings wherein:

FIGURE 1 is an isometric view of a preferred embodiment of the present invention;

FIGURE 2 is a cross-sectional view of reduced scale taken along line 2—2 of FIGURE 1;

FIGURE 3 is an end view taken along line 3—3 of FIGURE 2;

FIGURE 4 is a partial view of the framework of the instant invention shown partly in the collapsed position;

FIGURE 5 is an enlarged fragmentary view in cross section taken along line 5—5 of FIGURE 1; and FIGURE 6 is an enlarged portion of the framework partly in cross section showing the pivotal interconnection of the collapsible frameworks.

Referring now to the drawings, wherein like reference numerals indicate like or corresponding parts throughout the several views, there is shown, generally at 10, a pair of frames 12 and 14 adapted to cover a vehicle along the length thereof.

Each of the frames 12 and 14 includes a plurality of generally rectangular frameworks 16. The rectangular frameworks 16 each have a pair of elongated parallel conduit sections 18 which are interconnected at the respective ends thereof by a pair of parallel end conduit sections 20. The end conduit sections 20 are connected to the respective elongated conduit sections 18 by the elbow members 22 which are brazed, welded, or secured in any other appropriate manner to the end conduit sections 20 and the elongated conduit sections 18.

Connection means is provided for pivotally interconnecting adjacent frameworks 16 and includes a pair of T connections 24 disposed for rotation about each of the elongated conduit sections 18. The T connections 24 are in sealing relationship with the respective elongated conduit sections 18 to prevent fluid leakage therebetween, which will be more fully described hereinafter. Also included are the interconnecting conduit sections 26 which are secured at respective ends thereof intermediate two of the T connections 24, each of which is disposed on respective elongated conduit sections 18 of adjacent frameworks 16. As illustrated, the elongated conduit sections 18′ of each respective frame 12 and 14 are slightly shorter than the other elongated conduit sections 18 and interconnect two interconnecting conduit sections 26′ through the elbow members 22′. However, it will be clear to those skilled in the art that the length and spacing of the elongated conduit sections 18 is a matter of choice and, therefore, whether a particular frame terminates in a framework 16 or a shortened elongated conduit section 18′ is a matter of design within the confines of this invention.

Thus, it will be readily appreciated from the description thus far that the generally rectangular frameworks 16 are pivotally interconnected by the T connections 24 and the interconnecting conduit sections 26 so that each frame 12 and 14 is collapsible in the manner illustrated in FIGURE 4. However, to prevent the frameworks 16 from pivoting relative to one another so as to form each frame into a generally inverted U-shaped frame with a pair of legs and an interconnecting upper portion to form an enclosure for covering an automobile, securing means is provided which includes a first brace 28 for one leg of each frame, a second brace 30 for the other leg of each frame, and a third brace 32 for the upper portion of each frame which interconnects the legs of each frame. The first and second braces 28 and 30 respectively are pivotally connected to the respective lowermost elongated conduit sections 18′ and 18″ of each leg of the respective frames 12 and 14. In other words, there is a first brace 28 and a second brace 30 for each respective frame. The first braces 28 are respectively pivotally connected to the lowermost elongated conduit section 18′ of one leg of each of the frames 12 and 14, and the second braces 30 are respectively pivotally connected to the lowermost elongated conduit section 18″ of the other leg of each of the frames 12 and 14. Each of the respective braces 28, 30 and 32 are pivotally connected to an elongated conduit section by a pin 34, or the like, by being welded, brazed, or secured in any other appropriate manner to the respective elongated conduit sections 18′ and 18″. The third brace 32 of each respective frame 12 and 14 is movable so as to traverse all of the elongated conduit sections 18 of the upper portion of the respective frame.

A threaded stud 36 is attached by welding, brazing, or the like, to each elongated conduit section 18 of each of the respective frames 12 and 14. Each of the braces 28, 30 and 32 has a plurality of slots for receiving respective ones of the studs 36. Wing nuts 38 threadedly engage each of the studs 36 to secure the first braces 28 to the elongated conduit sections 18 associated with one leg of each frame and to secure the second braces 30 to the elongated conduit sections 18 associated with the other leg of each frame so that the frameworks 16 forming each leg of each frame 12 and 14 are prevented from pivoting relative to one another. Furthermore, the wing nuts 38 on the studs attached to the elongated conduit sections 18 of the upper portion of each frame 12 and 14 secure the respective third braces 32 to the respective elongated conduit sections 18 of the upper portion of each of the frames 12 and 14.

Each of the frames 12 and 14, therefore, includes a plurality of parallel elongated conduit sections 18 pivotally connected together and adapted to be formed into a generally inverted U-shaped enclosure by the securing braces 28, 30 and 32 for covering a vehicle.

As illustrated in FIGURE 1, the frames 12 and 14 are shown pulled apart with a space therebetween; however, the frames 12 and 14 are telescopic so that frame 14 may be moved into frame 12, as is more clearly illustrated in FIGURE 3, and during normal operation, the frames 12 and 14 overlap, as shown in FIGURE 2.

The vehicle washing assembly also includes a means disposed in the space between adjacent ones of the elongated conduit sections 18 of each frame for preventing the passage of fluid through the respective frames 12 and 14. Such means may take any appropriate form such as aluminum panels, or the like, but are illustrated here as comprising a spring biased roller 40 attached adjacent each respective elongated conduit section 18 by the flanges 42. The flange 42 is welded, brazed, or secured in any other appropriate manner adjacent each end of the respective elongated conduit sections 18. A pliable material 44 such as plastic, canvas, or the like, is wound about each of the rollers 40 for unwinding therefrom against the spring biasing of the roller 40. A pin 46, or the like, is secured to each elongated conduit section 18 so that the pliable material 44 is removably attachable by the hook 48 to the next adjacent elongated conduit section 18 upon being unwound from the roller 40. As is more clearly shown in FIGURE 5, the pliable material 44 may be unwound from the roller 40 like a conventional window shade and may be attached to the next adjacent elongated conduit section by the hook 48 so that fluid being sprayed within the respective frames 12 and 14 is prevented from passing through the respective frames 12 and 14.

As was alluded to previously, the T connections 24 are in sealed relationship with the elongated conduit sections 18. This is more clearly shown in FIGURE 6 wherein there is shown a T connection 24 having a pair of wheels 50 disposed between each T connection and the respective elongated conduit 18 to prevent the leakage of fluid therebetween. Furthermore, there is a retainer ring 52 disposed in mating slots in the T connection 24 and the elongated conduit 18 so as to prevent the T connection 24 from moving axially along the elongated conduit 18. The elongated conduit 18 has a series of holes 52 thereabout so as to communicate with the interconnecting conduit section 26 attached to each T connection 24.

Various ones of the elongated conduit sections 18 have orifices 54 for spraying fluid therefrom within the enclosure formed by each respective frame 12 and 14. Any appropriate number of the elongated conduit sections 18 may have orifices 54 therein depending upon the spray pattern desired.

The vehicle washing assembly also includes means 56 and 58 for supplying fluid to the respective elongated conduit sections 18 of the frameworks 16. The means for supplying fluid may be a water source 56 which supplies water to the pump 60 which in turn supplies water under pressure through the flexible conduit 62 to the respective frames 12 and 14. The conduit 62 is flexible to allow the frame 14 to be telescoped or moved within the frame 12. The means for supplying fluid may also be a hot air source 58 which supplies hot air or gases through the flexible conduit 62 and into the respective elongated conduit sections 18 of the frameworks 16 of the respective frames 12 and 14. Water may be supplied to the elongated conduits 18 for spraying through the orifices 54 to wash a vehicle such as an automobile, or the like, and hot air, or the like, may be forced through the elongated conduits 18 and out through the orifices 54 to aid in drying of the vehicle.

Furthermore, each of the respective frames 12 and 14 is provided with wheels 64 so that each frame may more easily be moved about. Each of the wheels 64 is rotatably mounted on an axle 66 which is in turn welded, brazed, or attached in any other appropriate manner to the flange 68 which is in turn secured by welding, brazing, or the like, to the lowermost elongated conduit section 18' or 18" of each leg of each respective frame 12 and 14.

The vehicle washing assembly may also include a blower means, shown generally at 70, attached to one of the frames 12 or 14. The blower means 70 includes an inlet canopy 72 atop of which is disposed a blower 74 having an outlet 76 attached thereto and adapted to be connected in communication with an exhaust environment so that moisture and gases from within the respective frames 12 and 14 may be removed therefrom. The blower means 70 is advantageous when the vehicle washing assembly of the instant invention is utilized within a garage of a home owner to expell steam and fine droplets of water which may be within the enclosure formed by the frames 12 and 14 respectively. The outlet 76 of the blower means 70 may be connected to a pipe, hose, or the like, leading to the outside of the garage for expelling the steam and fine droplets of water from within the garage to the outside atmosphere.

Also included is a ramp means comprising the ramps 78 which are disposed within the respective frames 12 and 14 for moving a vehicle thereon. A vehicle is shown in phantom within the frames 12 and 14 and on the ramps 78 in FIGURES 2 and 3.

A trough 80 is disposed adjacent the ramps 78 and within each respective frame 12 and 14 for extending about and beneath a vehicle to be moved onto the ramps 78. The trough 80 has outside sections 82 extending between each respective ramp 78 and the adjacent leg of the respective frames 12 and 14. The trough 80 also has a center portion 84 which extends between the respective ramps 78. A drain 86 is attached to the trough 80 for removing fluid which has been received by the trough 80 after having been sprayed from the orifices 54 onto a vehicle disposed within each of the respective frames 12 and 14. The drain 86 may be connected to a hose, or the like, so that water may be drained to an appropriate area for disposal. Furthermore, the trough 80 may be slanted in the direction toward the drain 86 so that water will always flow toward the drain 86 no matter what the slant is of the floor or surface upon which the trough 80 is disposed.

To further prevent fluid, which is sprayed within the respective frames 12 and 14, from passing through the frames 12 and 14, the pliable material 44 wound about the lowermost roller 40 on each leg of each respective frame 12 and 14 is removably attachable to a pin, bolt, or the like, on the respective trough portions 82. This is more clearly shown in FIGURE 3. By attaching the pliable material 44 of the lowermost rollers 40 of each of the respective frames 12 and 14 directly to the trough 80, drainage of fluid sprayed within each of the respective frames 12 and 14 is drained into the trough 80.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

I claim:

1. A vehicle washing assembly comprising: a collapsible frame including, a plurality of generally rectangular frameworks, each of said frameworks having a pair of elongated parallel conduit sections interconnected at the respective ends thereof by a pair of parallel end conduit sections, connection means for pivotally interconnecting adjacent frameworks, said connection means including a pair of T connections disposed for rotation about each of said elongated conduit sections, interconnecting conduit sections secured at respective ends thereof intermediate two of said T connections each of which is disposed on respective elongated conduit sections of adjacent frameworks; securing means for preventing said frameworks from pivoting relative to one another to form said frame into a generally inverted U-shaped frame with a pair of legs and an interconnecting upper portion, said securing means including first and second braces respectively pivotally connected to the respective lowermost elongated conduit section of each leg of said frame, a threaded stud attached to each elongated conduit section of each leg of said frame, said first and second braces having a plurality of slots for receiving respective ones of said studs, nut means on each of said studs for securing said first brace to said elongated conduit sections associated with one leg of said frame and for securing said second brace to said elongated conduit sections associated with the other leg of said frame whereby said frameworks forming each leg of said frame are prevented from pivoting relative to one another, said securing means further including a third brace pivotally connected to one of said elongated conduit sections of said upper portion of said frame which interconnects the leg portions of said frame, said third brace being movable to traverse all of said elongated conduit sections of said upper portion of said frame, a threaded stud attached to each elongated conduit section of said upper portion of said frame, said third brace having a plurality of slots for receiving respective ones of said last-mentioned studs, nut means on each of said last-mentioned studs for securing said third brace to respective elongated conduit sections of said upper portion of said frame; means disposed in the space between adjacent ones of said elongated conduit sections of said frame for preventing the passage of fluid through said frame including, a spring biased roller attached adjacent each respective elongated conduit section of said frame, a pliable material wound about each of said rollers for unwinding therefrom, said pliable material removably attachable to the next adjacent elongated conduit section upon being unwound from said roller; said T connections being sealed to said respective elongated conduit sections to prevent fluid leakage therebetween; various ones of said elongated conduit sections having orifices therein for spraying fluid within said frame; means for supplying fluid to said frameworks; said frame having wheels attached thereto; a blower means attached to said frame and adapted to be in communication with an exhaust environment for removing moisture and gases from within said frame; a ramp means for moving a vehicle thereon and within said frame; a trough means disposed adjacent said ramp means and said frame for extending about and beneath a vehicle to be moved onto said ramps; said pliable material wound about the lowermost of said rollers on said frame being removably attachable to said trough upon being unwound; and a drain means attached to said trough.

2. A vehicle washing assembly comprising: first and second collapsible frames each including, a plurality of generally rectangular frameworks, each of said frameworks having a pair of elongated parallel conduit sections interconnected at the respective ends thereof by a pair of parallel end conduit sections, connection means for pivotally interconnecting adjacent frameworks, said connection means including a pair of T connections disposed for rotation about each of said elongated conduit sections, interconnecting conduit sections secured at respective ends thereof intermediate two of said T connections each of which is disposed on respective elongated conduit sections of adjacent frameworks; securing means for preventing said frameworks from pivoting relative to one another to form each of said first and second frames respectively into a generally inverted U-shaped frame with a pair of legs and an interconnecting upper portion, securing means including a first brace and a second brace for each respective frame, said first braces respectively pivotally connected to the lowermost elongated conduit section of one leg of each of said first and second frames and said second braces respectively pivotally connected to the lowermost elongated conduit section of the other leg of each of said first and second frame, a threaded stud attached to each elongated conduit section of each leg of each of said first and second frames, said first and second braces having a plurality of slots for receiving respective ones of said studs, nut means on each of said studs for securing said first braces respectively to said elongated conduit sections associated with one leg of each of said frames and for securing said second braces respectively to said elongated conduit section associated with the other leg of each of said frames whereby said frameworks forming each leg of each of said first and second frames respectively are prevented from pivoting relative to one another, said securing means further including a third brace for each respective frame pivotally connected to one of said elongated conduit sections of the respective upper portions of each of said frames which interconnect the leg portions of each respective frame, said third brace associated with each respective frame being movable to traverse all of said elongated conduit sections of said upper portion of said respective frame, a threaded stud attached to each elongated conduit section of each of said upper portions of said respective frames, each of said third braces having a plurality of slots for receiving respective ones of said last-mentioned studs, nut means on each of said last-mentioned studs for securing each of said third braces to respective elongated conduit sections of said upper portion of said frame with which said third brace is associated; means disposed in the space between adjacent ones of said elongated conduit sections of said respective frames for preventing the passage of fluid through said respective frames including, a spring biased roller attached adjacent each respective elongated conduit section of each of said respective frames, a pliable material wound about each of said rollers for unwinding therefrom, said pliable material removably attachable to the next adjacent elongated conduit section upon being unwound from said roller; said T connections being sealed to said respective elongated conduit sections to prevent fluid leakage therebetween; various ones of said elongated conduit sections having orifices therein for spraying fluid within said frames; means for supplying fluid to said frameworks; said frames having wheels attached thereto; said first frame when in said generally inverted U shape being telescopic with said second frame when in said generally inverted U shape so that said first frame may be moved into said second frame; a blower means attached to one of said first and second frame and adapted to be in communication with an exhaust environment for removing moisture and gases from within said first and second frames; a ramp means for moving a vehicle thereon and within said first and second frames; a trough means disposed adjacent said ramp means and said respective frames for extending about and beneath a vehicle to be moved onto said ramps; said pliable material wound about the lowermost of said rollers on said respective frames being removably attachable to said trough upon being unwound; and a drain means attached to said trough.

3. A vehicle washing assembly comprising: a pair of first and second frames which are independent of one another and self supporting, said first frame being telescopic with said second frame may be moved into said second frame, each frame including a plurality of horizontally extending frameworks pivotally interconnected so that each frame may be positioned to form an enclosure for a vehicle and may be independently folded into a compact unit.

4. A vehicle washing assembly as set forth in claim 3 wherein each framework includes a pair of horizontal spaced parallel elongated conduit sections interconnected at the respective ends thereof by a pair of parallel end conduit sections, adjacent frameworks being spaced apart when formed into a frame, and connection means interconnecting adjacent frameworks for allowing the frameworks of each frame to pivot relative to one another for movement into and out of the compact unit.

5. A vehicle washing assembly as set forth in claim 4 including; securing means for preventing said frameworks of said respective frames from pivoting relative to one another to form each of said first and second frames respectively into a generally inverted U-shaped frame.

6. A vehicle washing assembly as set forth in claim 5 including a means for receiving fluid sprayed within said respective frames.

7. A vehicle washing assembly as set forth in claim 5 wherein said connection means includes; a pair of T connections disposed for rotation about each of said elongated conduit sections, and interconnecting conduit sections secured at respective ends thereof intermediate two of said T connections each of which is disposed on respective elongated conduit sections of adjacent frameworks.

8. A vehicle washing assembly as set forth in claim 7 wherein said T connections are sealed to said respective elongated conduit sections to prevent leakage therebetween, various ones of said elongated conduit sections have orifices therein for spraying fluid within the enclosures formed by said respective frames, and means for supplying fluid to said frameworks for flow therethrough to be sprayed from said orifices.

9. A vehicle washing assembly as set forth in claim 8 including a blower means attached to one of said first and second frames and adapted to be in communication with an exhaust environment for removing moisture and gases from within said enclosures formed by said first and second frames respectively.

10. A vehicle washing assembly as set forth in claim 5 including a ramp means for removing a vehicle thereon and within said enclosures formed respectively by said first and second frames.

11. A vehicle washing assembly as set forth in claim 10 including; a trough means disposed adjacent said ramp means and within said enclosures formed by said respective frames for extending about and beneath a vehicle to be moved onto said ramps, and a drain means attached to said trough means.

12. A vehicle washing assembly as set forth in claim 5 including means on each of said respective frames for preventing the flow of fluid from within said enclosures formed by said respective frames through said frameworks.

13. A vehicle washing assembly as set forth in claim 12 wherein said last-mentioned means includes; a spring biased roller adjacent each respective elongated conduit section of each of said respective frames, a pliable material wound on each of said rollers for unwinding therefrom, and said pliable material being removably attachable to the next adjacent elongated conduit section upon being unwound from said roller.

14. A vehicle washing assembly comprising: first and second collapsible frames, each of which is self supporting and independent of the other and may be formed into a frame for enclosing a portion of a vehicle, each frame including a plurality of generally rectangular frameworks, each of said frameworks having a pair of elongated parallel conduit sections interconnected at the respective ends thereof by a pair of parallel end conduit sections, connection means for pivotally interconnecting adjacent frameworks, said connection means including a pair of T connections disposed for rotation about each of said elongated conduit sections, and interconnecting conduit sections secured at respective ends thereof intermediate two of said T connections each of which is disposed on respective elongated conduit sections of adjacent frameworks, securing means for preventing said frameworks of said respective frames from pivoting relative to one another to form each of said first and second frames respectively into a generally inverted U-shaped frame, said securing means including a first brace and a second brace for each respective frame, said first braces respectively pivotally connected to the lowermost elongated conduit section of one leg of said first and second frames and said second braces respectively pivotally connected to the lowermost elongated conduit section of the other leg of said first and second frames, a threaded stud attached to each elongated conduit section of each of said first and second frames, said first and second braces having a plurality of slots for receiving respective ones of said studs, nut means on each of said studs for securing said first braces respectively to said elongated conduit sections associated with one leg of each of said frames and for securing said second braces respective to said elongated conduit sections associated with the other leg of each of said frames whereby said frameworks forming each leg of each of said first and second frames respectively are prevented from pivoting relative to one another, a third brace for each respective frame pivotally connected to one of said elongated conduit sections of said upper portion of said respective frame which interconnects the leg portions of said respective frame, said third brace associated with each respective frame being movable to traverse all of said elongated conduit sections of said upper portion of said respective frame, each of said third braces having a plurality of slots for receiving studs which are disposed on said elongated conduit sections of said upper portion of said frame with which said third brace is associated, and nut means on each of said last-mentioned studs for securing each of said third braces to respective elongated conduit sections of said upper portion of said frame with which said third brace is associated.

References Cited

UNITED STATES PATENTS

| | | | |
|---|---|---|---|
| 1,614,213 | 1/1927 | Smith | 134—123 |
| 2,470,337 | 5/1949 | Campbell | 135—5 X |
| 2,806,478 | 9/1957 | De Sherbinin | 135—7.1 X |
| 2,852,814 | 9/1958 | Bignardi | 52—67 |
| 3,072,131 | 1/1963 | Di Laurenzio | 134—123 |
| 3,079,935 | 3/1961 | Padek | 134—45 |
| 1,183,391 | 5/1916 | Mason | 134—123 |
| 1,842,099 | 1/1932 | Johnson. | |
| 2,698,629 | 1/1955 | Hall | 134—123 X |
| 2,981,266 | 4/1961 | Tamburri | 134—123 X |

FOREIGN PATENTS

| | | |
|---|---|---|
| 376,379 | 7/1932 | Great Britain. |
| 643,874 | 8/1962 | Italy. |
| 1,346,639 | 11/1963 | France. |
| 964,206 | 5/1957 | Germany. |
| 782,979 | 9/1957 | Great Britain. |
| 850,512 | 5/1960 | Great Britain. |

CHARLES A. WILLMUTH, *Primary Examiner.*

R. L. BLEUTGE, *Assistant Examiner.*